United States Patent [19]

Boettger et al.

[11] B 4,014,933

[45] Mar. 29, 1977

[54] PRODUCTION OF AMINES FROM ALCOHOLS

[75] Inventors: Guenther Boettger; Hubert Corr, both of Ludwigshafen; Herwig Hoffmann; Herbert Toussaint, both of Frankenthal; Siegfried Winderl, Heidelberg, all of Germany

[73] Assignee: BASF Aktiengesellschaft, Ludwigshafen, Germany

[22] Filed: Aug. 27, 1973

[21] Appl. No.: 391,828

[44] Published under the second Trial Voluntary Protest Program on April 6, 1976 as document No. B 391,828.

Related U.S. Application Data

[63] Continuation of Ser. No. 81,144, Oct. 15, 1970, abandoned.

[30] Foreign Application Priority Data

Oct. 23, 1969 Germany .......................... 1953263

[52] U.S. Cl. ........................ 260/563 R; 260/583 R; 252/454; 252/459; 252/466 J; 260/585 B
[51] Int. Cl.² .......................................... C07C 85/02
[58] Field of Search ........ 260/585 B, 583 R, 563 R; 252/454, 459, 466 J

[56] References Cited

UNITED STATES PATENTS

| | | |
|---|---|---|
| 3,270,059 | 8/1966 | Winderl et al. ................ 260/585 B |
| 3,475,344 | 10/1969 | Adam et al. .................... 260/585 B |
| 3,520,933 | 7/1970 | Adam et al. .................... 260/585 B |

Primary Examiner—Lewis Gotts
Assistant Examiner—D. R. Phillips
Attorney, Agent, or Firm—Johnston, Keil, Thompson & Shurtleff

[57] ABSTRACT

An improved method of preparing amines by reaction of alcohols with ammonia or primary or secondary amines at elevated temperature and superatmospheric pressure in the presence of hydrogen and a hydrogenation catalyst containing cobalt, nickel and copper, the improvement comprising using a catalyst which contains (calculated on the metal content of the catalyst) from 70 to 95% by weight of a mixture of cobalt and nickel and from 5 to 30% by weight of copper, the ratio by weight of cobalt to nickel being from 4:1 to 1:4. The amines prepared in this way are suitable for the production of emulsifying agents, plant protection agents and vulcanization accelerators.

6 Claims, No Drawings

PRODUCTION OF AMINES FROM ALCOHOLS

This is a continuation of application Ser. No. 81,144 filed Oct. 15, 1970 and now abandoned. It is known from UK Pat. No. 679,014 and U.S. Pat. No. 3,022,349 that amines can be prepared by reaction of alcohols with ammonia using copper catalysts. The reaction is however very incomplete and sometimes requires an afteramination over a nickel catalyst. Moreover mainly dialkylamines are formed.

According to another method described in U.S. Pat. No. 3,151,115, catalysts of nickel, cobalt, copper, manganese, chromium, molybdenum and thorium are used for the production of amines and polyamines. The disadvantage of this method is the high proportion of N-disubstituted amines in the amines formed. Thus for example in addition to ethylene diamine, a considerable proportion of undesired piperazine is obtained from ethanolamine. The same is true of German Printed application No. 1,170,960 where Raney nickel is used as catalyst.

It is furthermore known from UK Pat. No. 833,589 that oxides of nickel, cobalt or copper or mixtures of the same may be used as catalysts in the production of amines from alcohols. This method has the disadvantage that a very large amount of piperazine is obtained and very high temperatures are necessary.

The object of this invention is to provide a process in which good yields are achieved. Another object of the invention is to provide a process in which byproducts are at a minimum.

In accordance with this invention, these and other objects and advantages are achieved in an improved process for the production of amines by reaction of alcohols with ammonia or primary or secondary amines at elevated temperature and superatmospheric pressure in the presence of hydrogen and a hydrogenation catalyst containing cobalt, nickel and copper, in which the improvement comprises the use of a catalyst which (calculated on the metal content of the catalyst) contains 70 to 95% by weight of a mixture of cobalt and nickel and 5 to 30% by weight of copper, the ratio by weight of cobalt:nickel being from 4:1 to 1:4.

It is preferred to use a weight ratio of cobalt to nickel of from 2:1 to 1:2, particularly of 1:1, and a copper content of from 10 to 20% by weight, particularly 15% by weight, in the catalyst.

The catalyst used in the presence according to the invention may also contain up to two of the metals manganese, chromium, zinc, vanadium and silver.

The catalyst may also contain phosphoric acid or boric acid or a mixture of the two or the corresponding oxides or their salts or alkali metals, for example sodium or potassium, or alkaline earth metals, for example calcium or barium.

The abovementioned metals or acids which may be present in the catalyst in addition to cobalt, nickel and copper may be present in amounts of up to 20% by weight based on the metal content of the catalyst, advantageously up to 10% by weight, particularly 1 to 2% by weight (calculated as phosphorus pentoxide or boron trioxide).

Reaction between the alcohol and the ammonia or amine is carried out in the presence of hydrogen and in the presence or absence of water at a temperature of from 100° to 250°C at a pressure of from 10 to 250 atmospheres, particularly from 20 to 200 atmospheres.

Preferred starting materials are alkanols having one to eighteen carbon atoms, for example ethanol, propanol, butanol, pentanol, hexanol, 2-ethylhexanol, tridecanol and stearyl alcohol; cycloalkanols having five to twelve carbon atoms such as cyclohexanol; alkanolamines, for example ethanolamine, propanolamine, isopropanolamine, hexanolamine, diethanolamine and diisopropanolamine; or polyalcohols, particularly diols, having one to fifteen carbon atoms, for example ethylene glycol, propylene glycol, butanediol, pentanediol, hexanediol, 4,4'-bishydroxycyclohexylpropane-(2,2), or their glycol ethers, for example methyl glycol, ethyl glycol, buty glycol; or polyalkylene glycol ethers, for example polyethylene glycol ether, polypropylene glycol ether and polybutylene glycol ether.

When ammonia is used as the second reactant, primary amines are obtained. Primary amines may also be used as reactants and then secondary amines are obtained. When secondary amines are used, the corresponding tertiary amines are obtained. Preferred primary and secondary amines have alkyl radicals having one to twelve carbon atoms or cycloalkyl radicals having one to eight carbon atoms as substituents.

Examples of suitable amines are methylamine, dimethylamine, ethylamine, diethylamine, propylamine, butylamine, amylamine, hexylamine and cyclohexylamine. The ammonia or amine is used in a stoichiometric excess with reference to the alcohol. It is preferred to use from 5 to 50 moles, advantageously from 10 to 40 moles, particularly 20 to 30 moles of ammonia or amine per mole of amino group to be introduced. Hydrogen is supplied in an amount of from 5 to 100 liters per mole of alcohol component, particularly from 10 to 30 liters per mole of starting material.

The process according to the invention may also be carried out in the presence of water, for example from 1 to 50% by weight based on the alcohol component.

The catalyst is applied to a carrier, for example aluminum oxide or silicon dioxide. The metal content of the catalyst is advantageously from 5 to 80% by weight, particularly from 10 to 30% by weight, based on the whole catalyst.

Copper and the mixture of cobalt and nickel are advantageously used in the ratio from 1:20 to 1:3 in the catalyst. The other metals (manganese, chromium, silve, zinc or vanadium) or the acids (phosphoric acid or boric acid) or the alkali metals (sodium or potassium) or the alkaline earth metals (calcium or barium) are advantageously in the ratio from 1:200 to 1:10 to the mixture of cobalt and nickel.

The catalysts may be prepared by example by precipitating the metal components (with or without the said acis or their salts) as such or onto a powdered carrier, from their salts in aqueous solution, for example with sodium carbonate or sodium hydroxide, or the precipitate may be applied to such a carrier, the composition washed until neutral and then dried at elevated temperature, for example at temperatures of from 60° to 180°C; the composition is made into moldings such as tablets or pellets and heated for some time at elevated temperature, such as 300° to 800°C, in a muffle furnace. Instead of the said acids or their salts, it is also possible to use acids or salts which when heated are converted into pyroacids, polyacids or their salts, for example phosphoric acid. Prior to use, the catalyst is reduced with hydrogen, preferably at temperature of from 220° to 300°C.

Other catalysts containing cobalt, nickel and copper are obtained for example by adding aqueous solutions of the nitrates of cobalt, nickel and copper, with or without the said metals and the inorganic acids or their salts, to the preformed solid carrier and then heating the resultant impregnated catalyst to 300° to 800°C in a muffle furnace.

The reaction of the alcohol with ammonia or amine may be carried out without any solvent. It may be advantageous however to use the reaction discharge as a solvent.

The process according to the invention may be carried out batchwise. It is advantageous to carry out continuously. This method will now be described by way of example. A mixture of one of the said alcohols and ammonia or an amine in the said ratio is fed together with recycled reaction discharge into the top of a vertical high pressure tube which is filled with catalyst of the said composition. The feed may also be made hydraulically up from the bottom. At the same time hydrogen is metered in. The said conditions of pressure and temperature are maintained during the reaction. Ammonia or amine is removed from the reaction discharge which is then subjected to fractional distillation to isolate the desired amine.

Amines obtainable by the process according to the invention are suitable for the production of emulsifiers, plant protection agents and vulcanization accelerators.

The following Examples illustrate the invention. The parts given in the following Examples are parts by weight. They bear the same relation to parts by volume as the kilogram to the liter.

EXAMPLE 1

A vertical high pressure tube having a capacity of 500 parts by volume is filled with a catalyst which contains 10% by weight of cobalt oxide, 10% by weight of nickel oxide and 4% by weight of copper oxide on aluminum oxide. After the catalyst has been reduced with hydrogen at 250°C, there are metered in per hour at the top of the high pressure tube 100 parts of ethanolamine and 350 parts by volume of liquid ammonia, a temperature of 160°C being maintained. At the same time a pressure of 300 atmospheres gauge is maintained by forcing in hydrogen. Ammonia is distilled off from the reaction discharge. 115 parts per hour of a mixture is obtained which according to gas chromatographic analysis (calculated anhydrous) contains 49% of ethylenediamine, 36% of ethanolamine, 6% of piperazine and 8% of polyamines. The yield of ethylenediamine after a single pass is thus 77% based on reacted ethanolamine.

EXAMPLE 2

A vertical high pressure tube having a capacity of 500 parts by volume is filled with a catalyst which contains 10% by weight of cobalt oxide, 10% by weight of nickel oxide, 4% by weight of copper oxide and 0.2% by weight of phosphoric acid (calculated as $P_2O_5$) on aluminum oxide. Under experimental conditions as described in Example 1, 113 parts per hour of a mixture is obtained which according to gas chromatographic analysis and calculated anhydrous contains 44% of ethylenediamine, 46% of ethanolamine, 3% of piperazine and 5% of polyamines. The yield of ethylenediamine after a single pass is thus 82% with reference to reacted ethanolamine.

EXAMPLE 3

A vertical high pressure tube having a capacity of 500 parts by volume is filled with a catalyst which contains 10% by weight of cobalt oxide, 10% by weight of nickel oxide and 4% of copper oxide on aluminum oxide. After the catalyst has been reduced with hydrogen at 250°C, 100 parts per hour of an 80% aqueous hexanediol-(1,6) solution and 350 parts by volume of liquid ammonia are metered in at the top of the high pressure tube, a temperature of 220°C being maintained. A pressure of 300 atmospheres gauge is maintained at the same time by forcing in hydrogen. Ammonia is distilled off from the reaction discharge. 115 parts per hour of a mixture is obtained which according to gas chromatographic analysis and calculated anhydrous contains 49% of hexamethyleneimine, 23% of hexamethylenediamine, 7% of 1-aminobenzene-(6), 4% of hexanediol-(1,6), 9% of N-aminohexylhexamethyleneimine and 5% of polyamines. After the hexamethyleneimine has been separated, the remainder may be returned to the reactor.

EXAMPLE 4

A vertical high pressure tube having a capacity of 2000 parts by volume is filled with a catalyst which contains 10% by weight of cobalt oxide, 10% by weight of nickel oxide, 4% by weight of copper oxide and 0.2% by weight of phosphoric acid (calculated as $P_2O_5$) on aluminum oxide. After the catalyst has been reduced with hydrogen at 250°C, an hourly feed of 500 parts by volume of a 10% solution of 4,4'-bishydroxycyclohexylpropane-(2,2) in liquid ammonia is supplied to the top of the high pressure tube, a temperature of 220°C being maintained. A pressure of 300 atmospheres gauge is maintained at the same time by forcing in hydrogen. Ammonia is distilled off from the reaction discharge. 53 parts per hour of a mixture is obtained which according to gas chromatographic analysis (calculated anhydrous) contains 3% of 2-cyclohexyl-2-(4-aminocyclohexyl)-propane, 87% of 4,4'bisaminoocyclohexylpropane- 2,2), 6% of 4,4'-bishydroxycyclohexylpropane -(2,2) and 3% of residue. The yield of 4,4'-bisaminocyclohexylpropane-(2,2) after a single pass is thus 92% with reference to 4,4'-bishydroxycyclohexylpropane-(2,2).

EXAMPLE 5

A vertical high pressure tube having a capacity of 500 parts by volume is filled with a catalyst which contains 10% by weight of cobalt oxide, 10% by weight of nickel oxide, 2% by weight of copper oxide and 0.5% by weight of manganese oxide. After the catalyst has been reduced with hydrogen at 250°C, 50 parts per hour of diethanolamine and 350 parts by volume of liquid ammonia are metered in at the top of the high pressure tube, a temperature of 160°C being maintained. A pressure of 300 atmospheres gauge is maintained by forcing in hydrogen at the same time. Ammonia is distilled off from the reaction discharge. 58 parts per hour of a mixture is obtained which according to gas chromatographic analysis (calculated anhydrous) contains 4% of ethylenediamine, 22% of piperazine, 17% of N-($\beta$-hydroxyethyl)ethanolamine, 54% of diethanolamine and 1% of polyamines.

EXAMPLE 6

A vertical high pressure tube having a capacity of 500 parts by volume is filled with a catalyst silver, contains 10% by weight of cobalt oxide, 10% by weight of nickel oxide, 4% by weight of copper oxide and 0.4% by weight of phosphoric acid (calculated as $P_2O_5$). After the catalyst has been reduced with hydrogen at 250°C, 100 parts of polypropylene glycol (molecular weight about 1400) and 350 parts by volume of liquid ammonia are metered in per hour at the top of the high pressure tube, a temperature of 180°C being maintained. A pressure of 300 atmospheres gauge is maintained at the same time by forcing in hydrogen. Ammonia is distilled off from the reaction discharge. 102 parts per hour of a product is obtained which, calculated anhydrous, has an amine number of 76. This is conversion of 95%.

We claim:

1. In a process for the production of an amine by reacting an alkanol having one to eighteen carbon atoms; or a cycloalkanol having five to twelve carbon atoms; or an alkanolamine selected from the group consisting of ethanolamine, propanolamine, isopropanolamine, and hexanolamine; or a polyalcohol selected from the group consisting of diethanolamine, diisopropanolamine, ethylene glycol, propylene glycol, butanediol, pentanediol, hexanediol, 4,4'-bishydroxycyclohexyl-propane-(2,2); or a glycol ether selected from the group consisting of methyl glycol, ethyl glycol and butyl glycol; or and a polyalkylene glycol ether selected from the group consisting of polyethylene glycol ether, polypropylene glycol ether, and polybutylene glycol ether, with ammonia or a primary or a secondary amine, the ammonia or amine being present in an excess of from 5 to 50 moles over the stoichiometric amount of alcohol in the presence of hydrogen and a cobalt, nickel and copper-containing aluminum oxide or silicon dioxide supported catalyst at a temperature of from 100° to 200° C and at a pressure of from 10 to 250 atmospheres, the improvement which consists essentially of using a supported catalyst containing, based on the metal content of the catalyst, from 70 to 95% by weight of a mixture of cobalt and nickel and from 5 to 30% by weight of copper, the ratio by weight of cobalt to nickel being from 4:1 to 1:4, the metal content of the catalyst being from 5 to 80% by weight, based on the whole catalyst.

2. A process as set forth in claim 1, wherein the metal content of the catalyst is from 10 to 30% by weight, based on the whole catalyst.

3. A process as set forth in claim 1, wherein from 5 to 100 liters of hydrogen is used for each mole of alcohol.

4. A process as set forth in claim 1 wherein the catalyst additionally contains, besides cobalt and nickel, one or two of the metals manganese, chromium, zinc, vanadium and silver, and also sodium, potassium, calcium or barium in a ratio by weight of from 1:200 to 1:10 with reference to the mixture of cobalt and nickel.

5. A process as set forth in claim 1 wherein a catalyst is used which also contains phosphoric acid or boric acid.

6. A process as set forth in claim 1 wherein the ratio by weight of cobalt to nickel is from 2:1 to 1:2, and in which the metal content of the catalyst is from 80 to 90% by weight of a mixture of cobalt and nickel and from 10 to 20% by weight of copper.

* * * * *